(12) United States Patent
Kenmochi et al.

(10) Patent No.: US 8,296,932 B2
(45) Date of Patent: Oct. 30, 2012

(54) MANUFACTURING EQUIPMENT FOR ELECTRIC RESISTANCE WELDING PIPES HAVING EXCELLENT CHARACTERIZATION FOR WELDED SEAM

(75) Inventors: Kazuhito Kenmochi, Tokyo (JP); Takatoshi Okabe, Tokyo (JP); Hiroyasu Yokoyama, Tokyo (JP); Hiroyuki Shirosawa, Tokyo (JP); Tetsuro Sawaki, Tokyo (JP); Yuji Sugimoto, Tokyo (JP); Tomohiro Inoue, Tokyo (JP); Tatsuo Koide, Tokyo (JP)

(73) Assignee: JFE Steel Corporation (JP)

( * ) Notice: Subject to any disclaimer, the term of this patent is extended or adjusted under 35 U.S.C. 154(b) by 934 days.

(21) Appl. No.: 11/992,896

(22) PCT Filed: Nov. 9, 2006

(86) PCT No.: PCT/JP2006/322795
§ 371 (c)(1),
(2), (4) Date: Apr. 29, 2008

(87) PCT Pub. No.: WO2008/044323
PCT Pub. Date: Apr. 17, 2008

(65) Prior Publication Data
US 2008/0209715 A1    Sep. 4, 2008

(30) Foreign Application Priority Data

Oct. 12, 2006   (JP) .................... 2006-278601
Oct. 12, 2006   (JP) .................... 2006-278602

(51) Int. Cl.
*B23P 19/00*   (2006.01)
*B21C 37/08*   (2006.01)

(52) U.S. Cl. ...... 29/700; 29/525.14; 72/368; 72/370.04; 72/370.24

(58) Field of Classification Search .................... 72/368, 72/370.04, 370.13, 370.16, 370.24; 29/525.14, 29/700
See application file for complete search history.

(56) References Cited

U.S. PATENT DOCUMENTS 3,323,342 A * 6/1967 Baker .............................. 72/200
4,575,970 A * 3/1986 Kozai et al. ..................... 451/26

FOREIGN PATENT DOCUMENTS

| JP | 63-317212 A | 12/1988 |
| JP | 2-307686 A | 12/1990 |
| JP | 4-105709 A | 4/1992 |
| JP | 04300019 A * | 10/1992 |
| JP | 06134525 A * | 5/1994 |
| JP | 8-192228 A | 7/1996 |
| JP | 2001-170779 A | 6/2001 |
| JP | 2003-164909 A | 6/2003 |

* cited by examiner

*Primary Examiner* — Jermie Cozart
(74) *Attorney, Agent, or Firm* — DLA Piper LLP (US)

(57) ABSTRACT

Manufacturing equipment of electric resistance welding pipes having excellent characterization of welded seams, includes an apparatus that supplies a strip, an apparatus that reforms a shape, an apparatus that performs roll forming, an induction heater, and a contacting apparatus of strip edges by pressing, and having a finpass forming apparatus incorporating a fin having at least two stages of tapering in a middle portion of the roll forming, wherein tapering of the strip immediately before electric resistance welding is conducted such that an angle from a surface of a strip edge toward a vertical direction is in a range of 25 degrees to 50 degrees, and length of a perpendicular angle from a starting position to an end position of the tapering at one side is 20% to 45% of strip thickness, and by shaping the tapering with a fin, having at least two stages of tapering, incorporated in a finpass forming end stand.

6 Claims, 4 Drawing Sheets

PRIOR ART

MANUFACTURING EQUIPMENT FOR ELECTRIC RESISTANCE WELDING PIPES HAVING EXCELLENT CHARACTERIZATION FOR WELDED SEAM

RELATED APPLICATIONS

This is a §371 of International Application No. PCT/JP2006/322795, with an international filing date of Nov. 9, 2006, which is based on Japanese Patent Application Nos. 2006-278601, filed Oct. 12, 2006, and 2006-278602, filed Oct. 12, 2006.

TECHNICAL FIELD

This disclosure relates to manufacturing equipment for manufacturing pipes required to have toughness of welds such as line pipes for oil wells, or pipes required to have strength of welds such as casings for oil wells.

BACKGROUND

Generally, pipes are roughly classified into welding pipes and seamless pipes. An electric resistance welding pipe as one of the welding pipes is manufactured by rounding a sheet by roll forming or the like, and then confronting each edge and welding. In the welding pipes, toughness and strength of weld are generally bad compared with those of a mother strip. Thus, in use of the pipes, it is an inevitable problem to ensure certain toughness and strength of weld for each application.

For example, since a line pipe for transporting crude oil or natural gas is often laid in the cold latitudes, low temperature toughness is essentially concerned. Moreover, strength is importantly concerned with casings for protecting mining pipes in oil wells for mining crude oil.

Among the welding pipes, the electric resistance welding pipe is formed by welding without using weld metal, therefore a configuration of manufacturing equipment thereof includes at least an apparatus for supplying a strip, apparatus for reforming a shape of the supplied strip, apparatus for roll-forming the reformed strip, apparatus for inductively heating lateral edges of the roll-formed strip, and apparatus for pressure-welding the inductively heated, lateral edges. Furthermore, the manufacturing equipment often includes an apparatus for performing heat treatment of weld of the welded pipe, and an apparatus for shaping a profile of the pipe.

The apparatus for roll-forming the strip typically includes a break-down roll stand for arcuately bending a strip, cage roll stand for rounding the strip being arcuately bent into a pipe shape, and finpass forming stand for shaping the pipe that has been rounded.

Figure 7:
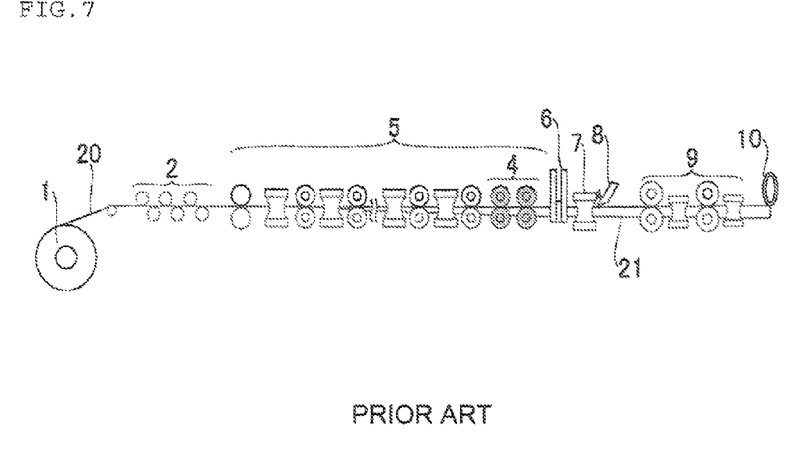
FIG. 7 is an explanatory diagram of the manufacturing equipment of electric resistance welding according to the prior art.

Such conventionally used, manufacturing equipment of electric resistance welding pipes is shown in FIG. 7. The manufacturing equipment is configured by an uncoiler 1 for supplying a strip 20; a leveler 2 for reforming the strip 20 to be flat; a roll forming machine 5 for gradually rounding the reformed strip 20; an induction heater 6 for inductively heating right and left, two lateral edges of the rounded strip 20; a squeeze roll (electric resistance welding section) 7 for contacting by pressing the inductively-heated lateral edges of the strip so as to be formed into a pipe 21; a bead cutter 8 for cutting a weld bead portion of the pipe 21; a sizer 9 for adjusting outer diameter of the pipe 21 after cutting; and a pipe cutter 10 for cutting out the pipe 21 being adjusted in outer diameter into a predetermined length. The roll forming machine 5 has a predetermined number (herein, two) of finpass forming stands 4 in a last stage. A fin shape of the finpass forming stand includes a one-stage tapering shape.

Typically, a hot-rolled sheet to be a mother strip of a pipe is subjected to composition design or heat treatment in consideration of properties of the mother strip after being formed into the pipe to secure properties of the mother strip such as toughness and strength.

However, since characterization of welded seam is severely affected by a welding method rather than the composition design or heat treatment of the mother strip, development in welding technique is particularly important in the case of electric resistance welding.

As a cause of problems for electric resistance welding, oxides called penetrators are given, which are generated on a lateral edge of a strip to be welded. In many cases, the penetrators are not discharged from the edge along with melting steel during electric resistance welding and remained thereon, and the remained penetrators cause reduction in toughness, leading to insufficient strength.

Thus, to remove the penetrators from weld as a main cause of the detects in electric resistance welding, earnest investigation has been made so far on an active discharging technique of melting steel from lateral edges of a strip to be welded.

For example, JP-A-2001-170779 or JP-A-2003-164909 describes an example of investigation on a shape of each lateral edge of a strip to be welded. That is, in the example, it is intended that right and left, lateral edges of a strip to be welded, which are typically formed in an approximately rectangular shape by slitting or edge shaving, are tapered before roll forming, and the tapered shape of the lateral edges improves discharge of melting steel during electric resistance welding.

For example, JP-A-57-031485 or JP-A-63-317212 describes an example of investigation on a shape of each lateral edge of a strip. In the example, it is intended that each lateral edge of a strip, which is typically formed in an approximately rectangular shape by slitting or edge shaving, is processed in shape before electric resistance welding so that the processed shape of the lateral edge improves discharge of melting steel during welding.

However, in the conventional methods described in JP-A-2001-170779 or JP-A-2003-164909, since a hole-shape rolling roll, cutting bite, and shaving roll are introduced as tapering means by a simply listed manner, there have been various problems for specifically using the method for a manufacturing process of electric resistance welding pipes, and therefore further detailed investigation has been needed.

That is, strips having various kinds of thickness are formed into electric resistance welding pipes in an actual manufacturing process of electric resistance welding pipes, and, for example, when the hole-shape rolling roll is used to shape the tapering on right and left, two lateral edges of a strip, different hole-shape rolling rolls must be prepared for each kind of strips having different thickness and the hole-shape rolling roll must be changed for each kind of the strips, therefore manufacturing efficiency of the pipes has been problematically reduced. Moreover, when the lateral edges of the strip are shaped with tapering by the cutting bite or the shaving roll before roll forming, since most of the tapering is crushed by finpass rolling using finpass forming stand, it has been significantly difficult that the lateral edges are shaped with the tapering by the cutting bite or the shaving roll in consideration of such crushing.

We investigated the method described in JP-A-57-031485 and, as a result, it was clarified that even if the amount of upset in finpass forming was greatly changed, it was significantly difficult to contact only a part of each lateral edge of the strip 20 to the fin of the finpass hole-shape roll. This is because since the lateral edge of the strip 20 was slightly work-hardened in a previous forming process, the whole lateral edge of the strip is easily deformed along the fin so as to perfectly fill the fin portion, consequently a shape of the fin is printed to the lateral edge of the strip. As a result, the lateral edge of the strip 20 is not in a desired shape immediately before electric resistance welding.

Moreover, we investigated the method described in JP-A-63-317212 and, as a result, confirmed the following. That is, to shape the tapering on the whole lateral edge of the strip 20 using the edger roll 11 in the middle of roll forming (at the upstream side of the finpass forming stand), since the edger roll, of which the diameter is gradually increased from a pipe outer-surface side to a pipe inner-surface side, needs to be used for forming as described in JP-A-63-317212, a lateral edge to be an edge at the pipe inner-surface side is shaved by the edger roll, which may problematically induce pads called "whisker." Furthermore, since large reaction force that opens the pipe-shaped strip 20 outward is exerted in a cross section direction of the strip 20 to be roll-formed, pressure between the edger roll 11 and the lateral edge of the strip 20 is necessarily reduced. As a result, as in JP-A-57-031485, the strip is hardly work-hardened through reduction of the lateral edge by the edger roll, and even if the amount of upset is reduced in subsequent finpass forming, the strip substantially fills the fin portion, therefore it is difficult that the lateral edge of the strip 20 is shaped as described in JP-A-63-317212.

It could therefore be advantageous to provide manufacturing equipment of electric resistance welding pipes, in which a lateral edge shape can be made into an appropriate shape immediately before electric resistance welding, thereby melting steel is sufficiently discharged during electric resistance welding so that penetrators are securely removed, consequently an electric resistance welding pipe having excellent characterization of welded seam can be obtained.

It could also be advantageous to provide manufacturing equipment of electric resistance welding pipes having excellent characterization of welded seam, in which each lateral edge of a strip is shaped with appropriate tapering immediately before electric resistance welding, so that welding quality can be kept excellent, in addition, reduction in manufacturing efficiency can be suppressed.

SUMMARY

We earnestly investigated methods of shaping the appropriate tapering on each lateral edge of a strip without a reduction in manufacturing efficiency even if strip thickness is changed and, as a result, conceived an idea that an upper surface side and a lower surface side of the lateral edge of the strip were preferably separately shaped with the tapering.

That is, when a lateral edge at one surface side is shaped with the tapering, then another lateral edge at the other surface side is shaped with the tapering, even if strip thickness is variously changed, it is enough that a vertical position of each apparatus that shapes the tapering on each lateral edge is finely adjusted, therefore manufacturing efficiency is not reduced.

Since most of the tapering shaped by the cutting bite or the shaving roll before roll forming is crushed through finpass forming, significantly large tapering having a length more than half the thickness of the strip is necessary to be shaped. However, a plurality of apparatuses for shaping the tapering are provided, thereby large tapering is shaped on a lateral edge at one surface side of the strip so that sufficiently large tapering can be remained after finpass forming, and another lateral edge on the other surface side can be shaped with tapering by another apparatus.

Since the strip is approximately flat in a roll forming entrance side, a lateral edge on one surface side is preferably shaped with the tapering by cutting or shaving. The apparatus for shaping the tapering by cutting or shaving requires a certain installation space because of its comparatively large size, therefore it is hardly installed in a place during or after roll forming since the strip is rounded and therefore a space between edges is reduced. Moreover, since an apparatus that performs cutting or shaving is hard to vertically constrain the strip only by the apparatus itself, high positioning accuracy is required for installation of the apparatus in conjunction with installation of an apparatus for holding a position through which the strip passes. Therefore, a station of each apparatus needs to be increased in stiffness, and consequently a wider installation space is required. Thus, the cutting or shaving apparatus is preferably installed in a place before roll forming.

At that time, to efficiently shape the tapering on the right and left, lateral edges, it is preferable that the cutting or shaving apparatus is configured to include a cutting or shaving roll, and the cutting or shaving roll is used with being inclined to a vertical edge in a thickness direction.

To shape the tapering on the lateral edge at the other surface side, a finpass forming stand is preferably used in the middle of roll forming. Since a finpass roll is filled with the strip in the finpass forming stand, the lateral edge is strongly pressed. Therefore, in the finpass forming stand, it is preferably that a fin shape is formed to be a two-stage tapering shape, and the fin shape is printed to the strip by using the strong pressing of the lateral edge of the strip.

As described before, in JP-A-57-031485 or JP-A-63-317212, a part of the lateral edge of the strip is pressed against the fin of the finpass hole-shape roll to shape the tapering on each lateral edge of the strip. However, according to our investigations, we found that, even if the whole circumference of the strip in a circumferential direction did not fill the finpass hole-shape roll, when the strip was loaded into the finpass hole-shape roll, the lateral edge was strongly pressurized by the fin, so that the fin portion was perfectly filled with the lateral edge. That is, we found that when the strip was loaded into the finpass hole-shape roll, a lateral edge of the strip being contacted to the fin and a laterally central portion of the strip (portion of a bottom of the pipe-shaped strip) situated at a side approximately 180 degrees opposite to a side of the lateral edge were in a beam deflection condition, so that reaction force of the strip, which acted to bend the cross section of the strip into an arcuate shape, was greatly exerted, consequently even if the strip did not fill the finpass hole-shape roll, large compression force was exerted on the lateral edge of the strip in the circumferential direction, as a result, the lateral edge of the strip was strongly pressurized by the fin, and consequently a shape of the fin was directly printed to the lateral edge of the strip.

Thus, we noticed a phenomenon that each lateral edge of the strip was strongly pressurized by the fin in the finpass forming, and conceived a method of shaping the predetermined tapering on the lateral edge of the strip by actively using the phenomenon. That is, we found that when the fin was shaped with two or more stages of tapering, even if the amount of upset was small in finpass forming, the lateral edge of the strip was able to be shaped with desired tapering, thereby the lateral edge of the strip was able to be shaped with appropriate tapering immediately before electric resistance welding.

We therefore provide:

1. Manufacturing equipment of electric resistance welding pipes having excellent characterization of welded seam characterized by including at least an apparatus for supplying a strip, an apparatus for reforming a shape, an apparatus for performing roll forming, an induction heater, and a contacting apparatus of strip edges by pressing, and having an apparatus for cutting or stone-grinding the strip edges or a hole-shape roll after the apparatus for reforming the shape.
2. Manufacturing equipment of electric resistance welding pipes having excellent characterization of welded seam characterized by including at least an apparatus for supplying a strip, an apparatus for reforming a shape, an apparatus for performing roll forming, an induction heater, and a contacting apparatus of strip edges by pressing, and having a finpass forming apparatus incorporating a fin having at least two stages of tapering in the middle of the roll forming.
3. Manufacturing equipment of electric resistance welding pipes having excellent characterization of welded seam characterized by including at least an apparatus for supplying a strip, an apparatus for reforming a shape, an apparatus for performing roll forming, an induction heater, and a contacting apparatus of strip edges by pressing, and having an apparatus for cutting or stone-grinding the strip edges or a hole-shape roll after the apparatus for reforming the shape, and a finpass forming apparatus incorporating a fin having at least two stages of tapering in the middle of the roll forming.
4. The manufacturing equipment of electric resistance welding pipes having excellent characterization of welded seam according to the previous section 1 or 3 characterized in that the cutting apparatus is designed such that cutting blades are disposed in a roll shape for cutting the strip edges.
5. The manufacturing equipment of electric resistance welding pipes having excellent characterization of welded seam according to the previous section 1 or 3 characterized in that the grinding apparatus is designed such that a grinding stone is disposed in a roll shape for stone-grinding the strip edges.
6. The manufacturing equipment of electric resistance welding pipes having excellent characterization of welded seam according to the previous section 2 or 3 characterized in that an apparatus that shapes the tapering on edges at an inner diameter side of a strip and an apparatus that shapes the tapering on edges at an outer diameter side of the strip are separately provided.
7. The manufacturing equipment of electric resistance welding pipes having excellent characterization of welded seam according to the previous sections 1 to 6 characterized in that the tapering of the strip immediately before electric resistance welding is made such that an angle from a surface of strip edge toward vertical direction is in a range of 25 degrees to 50 degrees, and length of a perpendicular from a starting position to an end position of the tapering at one side is 20% to 45% of strip thickness.

1 uncoiler
2 leveler
3 cutting or shaving means
3a cutting roll
3b shaving roll
3c motor
4 finpass forming stand
4a finpass forming first stand
4b finpass forming end stand
5 roll forming machine
6 induction heater
7 squeeze roll (electric resistance welding section)
8 bead cutting bite
9 sizer
10 pipe cutter
20 strip
21 pipe

DETAILED DESCRIPTION

Hereinafter, a representative example is described.

Figure 1:
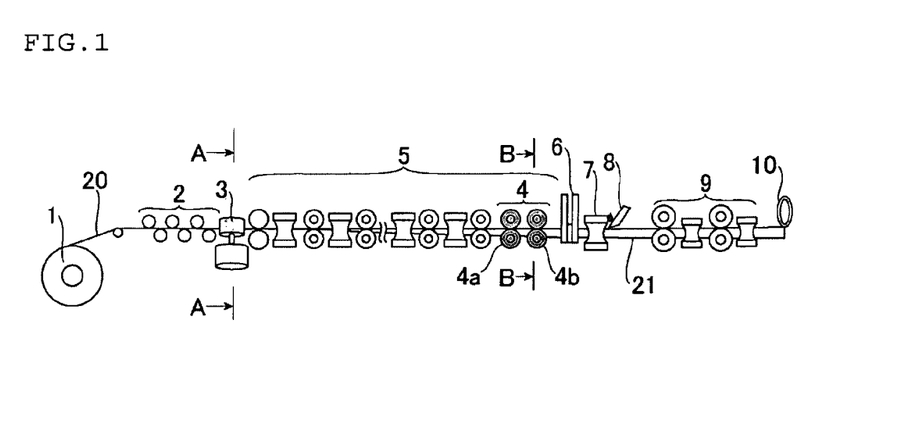
FIG. 1 is an explanatory diagram of the manufacturing equipment of electric resistance welding pipes according to one aspect.

FIG. 1 shows the manufacturing equipment of electric resistance welding pipes according to a representative example. The manufacturing equipment has a basic configuration including an uncoiler 1 for supplying a strip 20; a leveler 2 for reforming the strip 20 to be flat; a roll forming machine 5 for gradually rounding the reformed strip 20; an induction heater 6 for inductively heating right and left, two lateral edges of the rounded strip 20; a squeeze roll (electric resistance welding section) 7 for contacting the inductively-heated lateral edges by pressing so as to be formed into a pipe 21; a bead cutter 8 for cutting a weld bead portion of the pipe 21; a sizer 9 for adjusting outer diameter of the pipe 21 after cutting; and a pipe cutter 10 for cutting out the pipe 21 being adjusted in outer diameter into a predetermined length. The roll forming machine 5 has a predetermined number (herein, two) of finpass forming stands 4 in a last stage.

Figure 2:
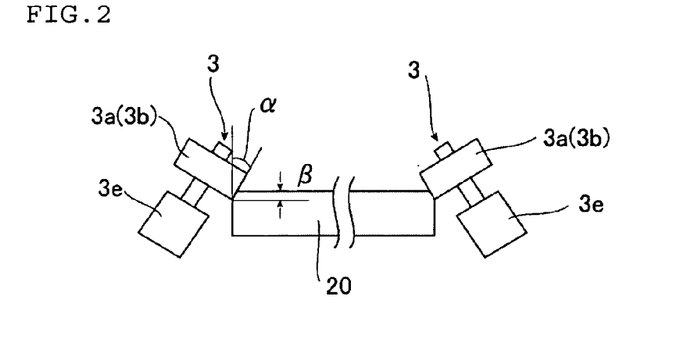
FIG. 2 is a diagram along an arrowed line A-A in FIG. 1.
Figure 3A:
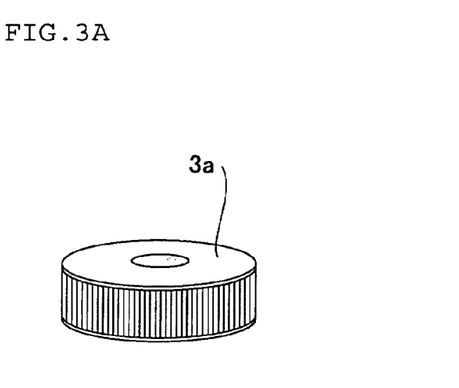
FIGS. 3A and 3B are partial detail diagrams of FIG. 2 respectively.
Figure 3B:
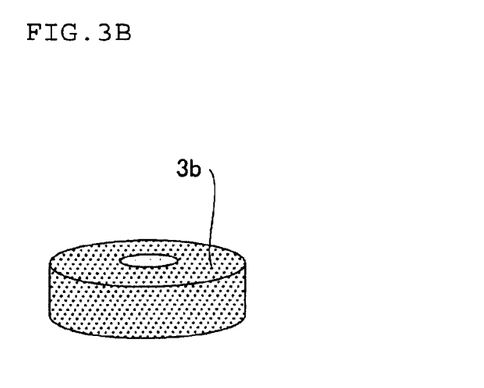

In addition to the basic configuration, the manufacturing equipment of electric resistance welding pipes has cutting or shaving means 3 for shaping the tapering on right and left, two lateral edges at a top side of the strip 20, the means 3 being provided between the leveler 2 and the roll forming machine 5. As shown in FIG. 2 showing a diagram along an arrowed line A-A in FIG. 1, and FIGS. 3A and 3B showing partial detail diagram of FIG. 2 respectively, the cutting or shaving means 3 rotates by a motor 3c a cutting tool 3a including cutting blades disposed in a roll shape (FIG. 3A), or a shaving stone 3b in a roll shape (FIG. 3B), and the cutting surface or shaving surface of the means is parallel to a roll axis. The cutting blades may be inclined with respect to a roll axis. A pair of the cutting or shaving means 3 are disposed right and left in a lateral direction of the strip 20, and each roll axis is inclined by a predetermined angle α with respect to a vertical direction, thereby right and left, two lateral edges at a top side of the strip 20 are shaped with the predetermined tapering (the slope angle from the lateral edge to the top is α, and a distance in a strip thickness direction from the top to a start position on the lateral edge is β). Hereinafter, the cutting tool 3*a* including the cutting blades disposed in the roll shape is called cutting roll 3*a*, and the shaving stone 3*b* in the roll shape is called shaving roll 3*b*.

Figure 4A:
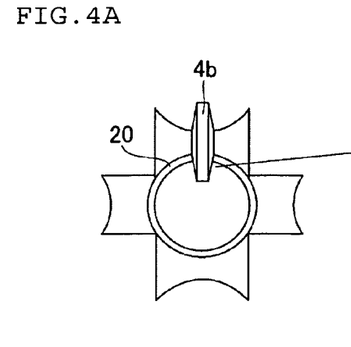
FIG. 4A is a diagram along an arrowed line B-B in FIG. 1.
Figure 4B:
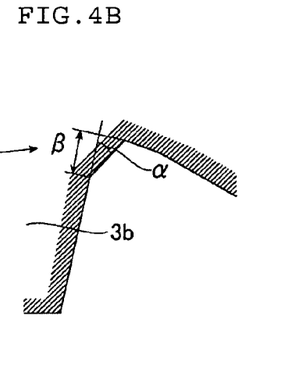
FIG. 4B is a partial detail diagram of FIG. 4A.

Furthermore, as shown in FIG. 4A showing a diagram along an arrowed line B-B in FIG. 1 and FIG. 4B showing a partial detail diagram of FIG. 4A, the manufacturing equipment of electric resistance welding pipes is designed such that an end stand 4*b* of the finpass forming stand 4 has a fin shape including two-stage tapering (a second-stage tapering angle is α, and second-stage slope vertical-length is β), and such a shape is printed to the lateral edges of the strip 20, thereby right and left, two lateral edges at a bottom side of the strip 20 (an outer surface side of a pipe 21) are shaped with the predetermined tapering (a slope angle from a lateral edge to a bottom is α, and a distance in a strip thickness direction from a start position on the lateral edge to the bottom is β).

In the manufacturing equipment of electric resistance welding pipes configured in the above, in the case that strips 20 having different thickness are successively threaded, when the predetermined tapering is shaped on right and left, two lateral edges at the top side and on those at the bottom side of each strip 20, the right and left, two lateral edges at the top side of the strip 20 are cut or shaved while the cutting roll 3*a* or the shaving roll 3*b* is inclined by the predetermined angle α, and a position in a height direction of the roll 3*a* or 3*b* is finely adjusted, so that the right and left, two lateral edges at the top side of the strip 20 are shaped with the predetermined tapering, and the fin shape is printed to the right and left, two lateral edges at the bottom side of the strip 20 by the end stand 4*b* of finpass forming, so that the right and left, two lateral edges at the bottom side of the strip 20 are shaped with the predetermined tapering. Thus, since the hole-shape rolling roll needs not be changed for each of strips having different thickness unlike in the prior art, the right and left, two lateral edges of the strip 20 can be shaped with the predetermined tapering depending on strip thickness without reducing production efficiency.

As hereinbefore, in the manufacturing equipment of electric resistance welding pipes, the right and left, two lateral edges of the strip 20 can be flexibly shaped with the appropriate tapering in response to change in thickness of the strip 20 before electric resistance welding. Therefore, welding quality can be excellently kept, and reduction in production efficiency can be suppressed, and consequently an electric resistance welding pipe having excellent characterization of welded seam can be efficiently manufactured.

The tapering shaped on the right and left, two lateral edges of the strip 20 is preferably made such that an angle from a vertical edge in a strip thickness direction (a slope angle from a lateral edge to a top or bottom of the strip 20) α is 25° to 50°, and length in a thickness direction from a starting position to an end position of the tapering (distance between the tapering starting position and the top or bottom on the lateral edge of the strip 20) β is 20% to 40% of strip thickness.

That is, when the slope angle α is less than 25°, melting steel is insufficiently discharged from the central portion in strip thickness, and penetrators are defectively remained, resulting in reduction in toughness or strength after electric resistance welding, and when the slope angle α is more than 50 degrees, the tapering is problematically remained as a flaw on a product pipe still after electric resistance welding. Moreover, when the distance β is less than 20% of thickness, melting steel is insufficiently discharged from the central portion in strip thickness, so that the penetrators tend to be remained, and when the distance β is more than 40% of thickness, the tapering is problematically remained as a flaw on a product pipe still after electric resistance welding.

FIG. 1 shows a basic configuration of the manufacturing equipment of electric resistance welding pipes according to another example. The manufacturing equipment has a basic configuration including an uncoiler 1 for supplying a strip 20; a leveler 2 for reforming the strip 20 to be flat; a roll forming machine 5 for gradually rounding the reformed strip 20; an induction heater 6 for inductively heating right and left, two lateral edges of the rolled strip 20; a squeeze roll (electric resistance welding section) 7 for contacting the inductively-heated lateral edges by pressing so as to be formed into a pipe 21; a bead cutter 8 for cutting a weld bead portion of the pipe 21; a sizer 9 for adjusting outer diameter of the pipe 21 after cutting; and a pipe cutter 10 for cutting out the pipe 21 being adjusted in outer diameter into a predetermined length. The roll forming machine 5 has a predetermined number (herein, two) of finpass forming stands 4 in a last stage.

Figure 4C:
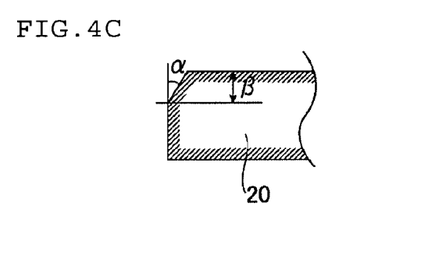
FIG. 4C is an explanatory diagram of tapering at a strip edge.

In the manufacturing equipment of electric resistance welding pipes, while a fin of the finpass forming first stand 4*a* has typical one-stage tapering, as shown in FIG. 4A showing a cross section diagram and FIG. 4B showing a partial detail diagram of FIG. 4A, a fin of the end stand (here, second stand) 4*b* has two-stage tapering (a second-stage tapering angle is α, and second-stage slope vertical-length is β), and such a shape is printed to right and left, two lateral edges of the strip 20, thereby as shown in FIG. 4C, right and left, two lateral edges at a side to be an outer surface side of a pipe are shaped with the predetermined tapering (a slope angle from a lateral edge to a surface to be the outer surface of the pipe is α, and a distance in a thickness direction between a start position on the lateral edge and the surface to be the outer surface of the pipe is β).

The tapering shaped on the right and left, two lateral edges of the strip 20 is made such that an angle from a vertical edge in a strip thickness direction (a slope angle from a lateral edge of the strip 20 to a surface to be an outer surface of a pipe) α is 25° to 50°, and length in a strip thickness direction from a starting position to an end position of the tapering (distance between the tapering starting position on the lateral edge and the surface to be the outer surface of the pipe in a strip thickness direction) β is 20% to 40% of strip thickness.

This is because when the slope angle α is less than 25°, melting steel is insufficiently discharged from the central portion in strip thickness, and penetrators are defectively remained, resulting in reduction in toughness or strength after electric resistance welding, and when the slope angle α is more than 50 degrees, the tapering is problematically remained as a flaw on a product pipe still after electric resistance welding. Moreover, when the distance β is less than 20% of thickness, melting steel is insufficiently discharged from the central portion in strip thickness, so that the penetrators tend to be remained, and when the tapering starting distance β is more than 40% of strip thickness, the tapering is problematically remained as a flaw on a product pipe still after electric resistance welding.

As described above, the fin shape of the finpass forming end stand 4*b* is made to include the tapering having two angles, and the fin shape is printed to the right and left, two lateral edges of the strip 20, therefore a shape of each lateral edge of the strip 20 can be shaped with appropriate tapering immediately before electric resistance welding. As a result, the melting steel is sufficiently discharged during electric resistance welding, and the penetrators are securely removed, and consequently an electric resistance welding pipe having excellent characterization of welded seam can be obtained.

In the above, right and left, two lateral edges at a side to be a pipe inner-surface side can be also shaped with predetermined tapering by changing a shape of the two-stage tapering.

The manufacturing equipment of electric resistance welding pipes according to still another example also has the basic configuration as shown in FIG. 1.

Figure 5A:
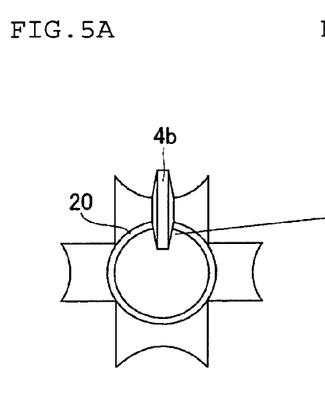
FIG. 5A is a diagram along an arrowed line B-B in FIG. 1 according to another aspect.
Figure 5B:
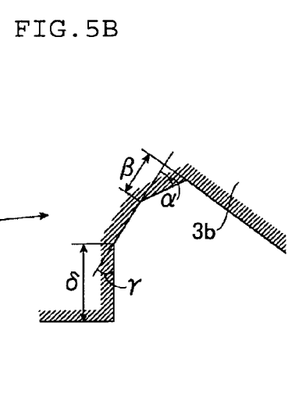
FIG. 5B is a partial detail diagram of FIG. 5A.
Figure 5C:
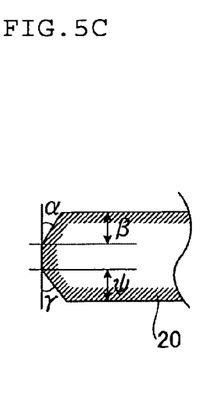
FIG. 5C is an explanatory diagram of tapering at a strip edge.

In the manufacturing equipment of electric resistance welding pipes, while a fin of the finpass forming first stand 4a has typical one-stage tapering, as shown in FIG. 5A showing a cross section diagram and FIG. 5B showing a partial detail diagram of FIG. 5A, a fin of the end stand (here, second stand) 4b has three-stage tapering (first-stage slope vertical-length is δ, a second-stage tapering angle is γ, a third-stage tapering angle is α, and third-stage slope vertical-length is β), and such a shape is printed to right and left, two lateral edges of the strip 20, thereby as shown in FIG. 5C, right and left, two lateral edges at a side to be an outer surface side of a pipe are shaped with the predetermined tapering (a slope angle from a lateral edge to a surface to be the outer surface of the pipe is α, and a distance in a strip thickness direction between a start position on the lateral edge and the surface to be the outer surface of the pipe is β), and right and left, two lateral edges at a side to be an inner surface side of the pipe are shaped with the predetermined tapering (a slope angle from a lateral edge to a surface to be the inner surface of the pipe is γ, and a distance in a strip thickness direction between a starting position on the lateral edge and the surface to be the inner surface of the pipe is φ). However, when one of the angles of the three-stage fin is larger than an angle in a vertical direction of the finpass roll, a lateral edge of the strip is shaved by the fin, which may induce pads called "whisker," resulting in generation of a flaw during finpass forming, or causing spark in electric resistance welding. Therefore, the fin angle is preferably not more than the angle in the vertical direction of the finpass roll.

The tapering shaped on the right and left, two lateral edges of the strip 20 is made such that the slope angle α from the lateral edge of the strip 20 to the surface to be the outer surface of the pipe, and the slope angle γ from the lateral edge to the surface to be the inner surface of the pipe are 25° to 50° respectively, and the distance β in the strip thickness direction between the tapering start position on the lateral edge and the surface to be the outer surface of the pipe, and the distance φ in the strip thickness direction between the tapering start position and the surface to be the inner surface of the pipe are 20% to 40% of strip thickness respectively.

This is because when the slope angle α or γ is less than 250, melting steel is insufficiently discharged from the central portion in strip thickness, and penetrators are defectively remained, resulting in reduction in toughness or strength after electric resistance welding, and when the slope angle α or γ is more than 50 degrees, the tapering is problematically remained as a flaw on a product pipe still after electric resistance welding. Moreover, when the tapering starting distance β or φ is less than 20% of thickness, melting steel is insufficiently discharged from the central portion in strip thickness, so that the penetrators tend to be remained, and when the tapering start distance β or φ is more than 40% of thickness, the tapering is problematically remained as a flaw on a product pipe still after electric resistance welding.

As described above, the fin shape of the finpass forming end stand 4b is made to include the tapering having three angles, and the fin shape is printed to the right and left, two lateral edges of the strip 20, therefore a shape of each lateral edge of the strip 20 can be shaped with appropriate tapering immediately before electric resistance welding. As a result, the melting steel is sufficiently discharged during electric resistance welding, and the penetrators are securely removed, and consequently an electric resistance welding pipe having excellent characterization of welded seam can be obtained.

The manufacturing equipment of electric resistance welding pipes according to still another also has the basic configuration as shown in FIG. 1.

Figure 6A:
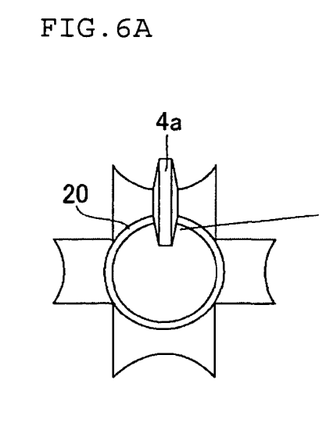
FIGS. 6A to 6F are explanatory diagrams of the manufacturing equipment of electric resistance welding pipes according to another aspect, respectively.
Figure 6B:
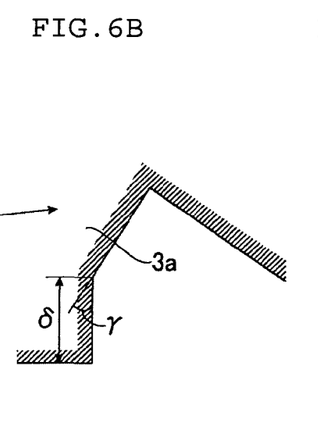
Figure 6C:
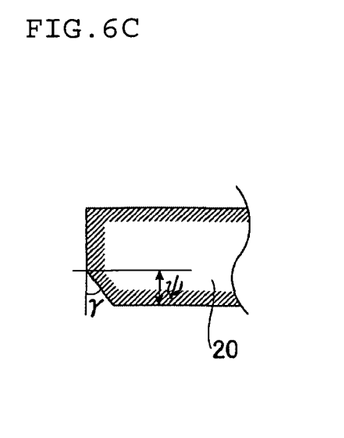
Figure 6D:
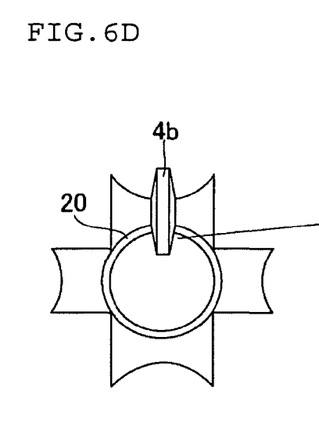
Figure 6E:
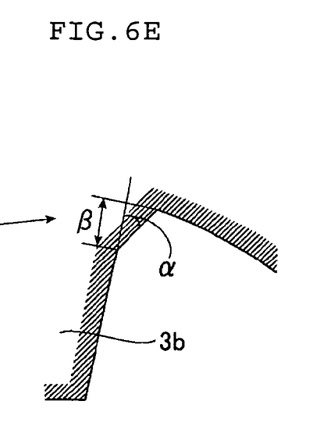
Figure 6F:
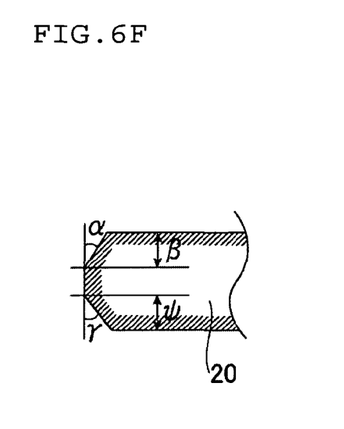

In the manufacturing equipment of electric resistance welding pipes, as shown in FIG. 6A showing a cross section diagram and FIG. 6B showing a partial detail diagram of FIG. 6A, a fin of the finpass forming first-stand 4a in a former stage has two-stage tapering (first-stage slope vertical-length is δ and a second-stage tapering angle is γ), and such a shape is printed to right and left, two lateral edges of the strip 20, thereby as shown in FIG. 6C, right and left, two lateral edges at a side to be an inner surface side of a pipe are shaped with predetermined tapering (a slope angle from a lateral edge to a surface to be an inner surface of the pipe is γ, and a distance in a strip thickness direction between a starting position on the lateral edge and the surface to be the inner surface of the pipe is φ). In addition, as shown in FIG. 6D showing a cross section diagram and FIG. 6E showing a partial detail diagram of FIG. 6D, a fin of the finpass forming end stand (here, second stand) 4b in a latter stage has two-stage tapering (a second-stage tapering angle is α and second-stage slope vertical-length is β), and such a shape is printed to right and left, two lateral edges of the strip 20, thereby as shown in FIG. 6F, right and left, two lateral edges at a side to be an outer surface side of the pipe are shaped with predetermined tapering (a slope angle from the lateral edge to a surface to be the outer surface of the pipe is α, and a distance in a strip thickness direction between a starting position on the lateral edge and a surface to be the outer surface of the pipe is β).

When each lateral edge at a side to be the inner surface side of the pipe is shaped with the tapering by the finpass forming first-stand 4a, the shaped portion is significantly work-hardened by strong pressure, therefore even if the lateral edge is further shaped with tapering by the finpass forming end stand 4b, the tapering shaped by the first stand 4a is relatively hardly crushed. Therefore, the lateral edges of the strip can be shaped with the predetermined tapering in either of the inner and outer surface sides of the pipe after finpass forming is finished.

The tapering shaped on the right and left, two lateral edges of the strip 20 is made such that the slope angle α from the lateral edge of the strip 20 to the surface to be the outer surface of the pipe, and the slope angle γ from the lateral edge to the surface to be the inner surface of the pipe are 25° to 50° respectively, and the distance β in a strip thickness direction between the tapering starting position on the lateral edge and the surface to be the outer surface of the pipe, and the distance φ in the strip thickness direction between the tapering starting position and the surface to be the inner surface of the pipe are 20% to 40% of strip thickness respectively.

This is because when the slope angle α or γ is less than 25°, melting steel is insufficiently discharged from the central portion in strip thickness, and penetrators are defectively remained, resulting in reduction in toughness or strength after electric resistance welding, and when the slope angle α or γ is more than 50 degrees, the tapering is problematically remained as a flaw on a product pipe still after electric resistance welding. Moreover, when the tapering start distance β or φ is less than 20% of thickness, the melting steel is insufficiently discharged from the central portion in strip thickness, and the penetrators tend to be remained, and when the tapering start distance β or φ is more than 40% of thickness, the tapering is problematically remained as a flaw on a product pipe still after electric resistance welding.

As described above, finpass forming is performed such that the fin shape of the first stand 4a in the former stage and the fin shape of the end stand (here, second stand) 4b in the latter stage are made to include the tapering having two angles respectively, and the respective fin shapes are printed to the right and left, two lateral edges of the strip 20, therefore the lateral edges of the strip 20 can be shaped with appropriate tapering immediately before electric resistance welding. As a result, the melting steel is sufficiently discharged during electric resistance welding, and the penetrators are securely removed, and consequently an electric resistance welding pipe having excellent characterization of welded seam can be obtained.

The reason why the lateral edges at the pipe inner-surface side or the pipe outer-surface side of the strip are shaped with the tapering by the finpass forming end stand (here, second stand) 4b is because since electric resistance welding is performed immediately after that, the electric resistance welding can be performed with the excellent tapering being kept. However, it is also acceptable that the lateral edges of the strip are shaped with the tapering by a finpass forming start stand or finpass forming middle stand, but not shaped with the tapering by the finpass forming end stand. Once the lateral edges of the strip are shaped with the tapering, the lateral edges are significantly work-hardened by strong pressure, therefore even if the lateral edges are subjected to finpass forming thereafter, the tapering is relatively hardly crushed, and consequently a state where the lateral edges are shaped with the tapering can be kept still after finpass forming is finished.

Example 1

A strip (steel strip) 1920 mm in width and 19.1 mm in thickness was used to manufacture electric resistance welding pipes 600 mm in diameter, and then a strip (steel strip) 1920 mm in width and 11.3 mm in thickness was used to manufacture electric resistance welding pipes 600 mm in diameter.

Test pieces were cut out from the weld of the manufactured electric resistance welding pipes, and subjected to a Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and Charpy impact values and brittle fracture surface ratios were measured. A Charpy impact value of 125 J or more, and a brittle fracture surface ratio of 35% or less were specified as an allowable range of performance respectively.

Example

As an example, the manufacturing equipment of electric resistance welding pipes according to the structure shown in FIG. 1 was used to manufacture the electric resistance welding pipes. At that time, the cutting roll 3a shown in FIG. 3A was used as the cutting or shaving means 3 for shaping the tapering on the right and left, two lateral edges at a top side of a strip. The slope angle α of the tapering was made to be 30° in either of the top side and a bottom side.

Prior Art Example

As a prior art example, the manufacturing equipment of electric resistance welding pipes as shown in FIG. 7 was used to manufacture the electric resistance welding pipes.

Measurements were made on Charpy impact values and brittle fracture surface ratios of the weld of the electric resistance welding pipes manufactured according to the above, and results of the measurements are shown in Table 1.

TABLE 1

| | Means of shaping the tapering at top side | Means of shaping the tapering at bottom side | Tapering angle immediately before electric resistance welding | Charpy impact value | Brittle fracture surface ratio |
|---|---|---|---|---|---|
| Example | Cutting roll | Finpass forming roll | 30° | 350 J | 15% |
| Prior art example | Not provided | Not provided | No tapering | 20 J | 58% |

From Table 1, in the example, the weld has high impact strength and a small brittle fracture surface ratio, that is, toughness is excellent, and reliability of products is high. In contrast, in the prior art example, the weld has low impact strength and a large brittle fracture surface ratio, that is, toughness is reduced, and reliability of products is low.

Example 2

A strip (steel strip) 1920 mm in width and 19.1 mm in thickness was used to manufacture electric resistance welding pipes 600 mm in diameter. Test pieces were cut out from the weld of the manufactured electric resistance welding pipes, and subjected to a Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and Charpy impact values and brittle fracture surface ratios were measured. A Charpy impact value of 125 J or more, and a brittle fracture surface ratio of 35% or less were specified as a performance allow-able range respectively.

Example

As an example, the manufacturing equipment of electric resistance welding pipes according to another example described above was used to manufacture the electric resistance welding pipes. Either of the slope angle α at a side to be a pipe outer-surface side and the slope angle γ at a side to be a pipe inner-surface side was made to be 25°.

Prior Art Example

As a prior art example, the prior-art manufacturing equipment of electric resistance welding pipes as shown in FIG. 7 was used to manufacture the electric resistance welding pipes.

Measurements were made on Charpy impact values and brittle fracture surface ratios of the weld of the electric resistance welding pipes manufactured according to the above, and results of the measurements are shown in Table 2. Moreover, lateral edges of the strips immediately before electric resistance welding were cut out and sampled, and shapes of the lateral edges were observed, and results of such observation are also described.

TABLE 2

| | Target value of tapering in finpass forming | Measured value of tapering immediately before electric resistance welding | Charpy impact value | Brittle fracture surface ratio |
|---|---|---|---|---|
| Example | 25° at pipe outer-surface side 25° at pipe inner-surface side | 25° at pipe outer-surface side 25° at pipe inner-surface side | 370 J | 15% |
| Prior art example | Not set | Not set | 20 J | 58% |

From Table 2, in the example, the weld has high impact strength and a small brittle fracture surface ratio, that is, toughness is excellent, and reliability of products is high. In contrast, in the prior art example, the weld has low impact strength and a large brittle fracture surface ratio, that is, toughness is reduced, and reliability of products is low.

The invention claimed is:

1. Manufacturing equipment of electric resistance welding pipes having excellent characterization of welded seams, comprising:
   an apparatus that supplies a strip,
   an apparatus that reforms a shape,
   an apparatus that performs roll forming,
   an induction heater, and
   a contacting apparatus of strip edges by pressing, and having a finpass forming apparatus incorporating a fin having at least two stages of edge tapering in a middle portion of the roll forming, wherein tapering edges of the strip immediately before electric resistance welding is conducted such that an angle from as surface of an edge of the strip toward a vertical direction is in a range of 25 degrees to 50 degrees, and length of a perpendicular angle from a starting position to an end position of the edge tapering at one side is 20% to 45% of strip thickness, and by shaping the edge tapering with a fin, having at least two stages of edge tapering, incorporated in a finpass forming end stand.

2. The manufacturing equipment according to claim 1, further comprising:
   an apparatus that shapes the tapering on the edges at an inner diameter side of a strip; and
   an apparatus that shapes the tapering on the edges at an outer diameter side of the strip.

3. Manufacturing equipment of electric resistance welding pipes having excellent characterization of welded seams, comprising:
   an apparatus that supplies a strip,
   an apparatus that reforms a shape,
   an apparatus that performs roll forming,
   an induction heater, and
   a contacting apparatus of strip edges by pressing, and having an apparatus for cutting or stone-grinding the strip edges or a hole-shape roll after the apparatus for reforming the shape, and a finpass forming apparatus incorporating a fin having at least two stages of edge tapering in the middle of the roil forming, wherein tapering edge of the strip immediately before electric resistance welding is conducted such that an angle from a surface of an edge of the strip toward a vertical direction is in a range of 25 degrees to 50 degrees, and length of a perpendicular angle from a starting position to an end position of the edge tapering at one side is 20% to 45% of strip thickness, and by shaping the edge tapering with a fin, having at least two stages of edge tapering, incorporated in a finpass forming end stand.

4. The manufacturing equipment according to claim 3, wherein:
   the cutting apparatus is designed such that cutting blades are disposed in a roll shape for cutting the strip edges.

5. The manufacturing equipment according to claim 3, wherein:
   the grinding apparatus is designed such that a grinding stone is disposed in a roll shape for stone-grinding the strip edges.

6. The manufacturing equipment according to claim 3, further comprising:
   an apparatus that shapes the tapering on edges at an inner diameter side of a strip; and
   an apparatus that shapes the tapering on the edges at an outer diameter side of the strip.

* * * * *